United States Patent [19]

Imada et al.

[11] Patent Number: 4,995,037
[45] Date of Patent: Feb. 19, 1991

[54] ADJUSTMENT METHOD AND APPARATUS OF A COMPUTER

[75] Inventors: Toyohisa Imada; Yoshiharu Kazama, both of Hadano, Japan

[73] Assignee: Hitachi, Ltd., Tokyo, Japan

[21] Appl. No.: 192,521

[22] Filed: May 11, 1988

[30] Foreign Application Priority Data

May 13, 1987 [JP] Japan .............................. 62-114571

[51] Int. Cl.⁵ .............................................. G06F 11/22
[52] U.S. Cl. ..................................... 371/16.1; 371/23
[58] Field of Search .................... 371/15.1, 16.1, 20.1, 371/23, 19, 12, 13, 18, 9.1, 16.5, 29.1; 364/945.1, 285.2

[56] References Cited

FOREIGN PATENT DOCUMENTS 2096371 10/1982 United Kingdom .................. 371/16

OTHER PUBLICATIONS

Tendolkar, N. et al.,"Automated Diagnostic Methodology for the IBM 3081 Processor Complex", IBM J. Res. Develop., vol. 26, No. 1, Jan. 1982, pp. 78–88.
Monachino, M., "Design Verification System for Large-Scale LSI Deigns", IBM J. Res. Develop., vol. 26, No. 1, Jan. 1982, pp. 89–99.
Vogelsberg, R., "Computer Technique for Logout Analysis", IBM Technical Disclosure Bulletin, vol. 14, No. 8, Jan., 1972, pp. 2432–2432.

Primary Examiner—Jerry Smith
Assistant Examiner—Stephen M. Baker
Attorney, Agent, or Firm—Antonelli, Terry, Stout & Kraus

[57] ABSTRACT

A method and apparatus for providing data for adjusting an electronic computer having a main storage unit, in a system including a service processor connected to the electronic computer to maintain the same, and an external storage unit for storing data of internal registers of the electronic computer, which are read out by the service processor. An adjusting program is executed by the electronic computer until a logical failure is detected in the electronic computer to be adjusted. Once the logical failure is detected, execution is stopped at an instruction an arbitrary number of instruction before the instruction on which the failure was detected. Thereafter, the electronic computer is caused to re-execute the adjusting program. Data of internal registers and the main storage unit of the electronic computer is stored in the eternal storage unit through the service processor when the electronic computer stops execution of the adjusting program. A previously adjusted electronic computer is loaded with the data of the external storage unit and is caused to execute a simulation of the electronic computer using a similation model of the electronic computer to determine the state of the internal registers of the electronic computer in the model.

10 Claims, 7 Drawing Sheets

| THE COUNT OF THE SIMULATION CYCLE | NAME OF THE LOGICAL GATE |
|---|---|
| 0 | REG. 10 |
| 0 | REG. 15 |
| 0 | LOGIC 11 |
| 0 | LOGIC 12 |
| 0 | LOGIC 13 |

FIG. 11

| NAME OF THE LOGICAL GATE (GATE) | SINK OF THE LOGICAL GATE (FOUTG) |
|---|---|
| REG. 10 | LOGIC 11, LOGIC 12 |
| LOGIC 11 | LOGIC 13 |
| LOGIC 12 | LOGIC 13 |
| LOGIC 13 | LOGIC 15 |
| REG. 15 | — |

FIG. 12

ADJUSTMENT METHOD AND APPARATUS OF A COMPUTER

BACKGROUND OF THE INVENTION

The present invention relates to a physical adjustment method apparatus of an electronic computer or the like and, more particularly, to an electronic computer adjusting method apparatus which is suited for shortening the period of a logical failure analysis and improving the efficiency of a physical adjustment by using a computer having a simulation program.

In the prior art, an electronic computer is adjusted by scanning out the data of a variety of registers in the computer by a service processor and storing them in a scan-out memory, transferring the data in an external storage unit such as a floppy disc through the service processor, and analyzing a logical failure in the electronic computer view of the content of the data.

The above described technique is disclosed in Japanese patent application No. 200354/1984. According to the technique of Japanese patent application No. 200345/1984, the scan-out information in each cycle is stored during the testing of a computer in the scan-out memory of a service processor and then stored on a floppy disc. If necessary, the scan-out information is read out at a desired time from the floppy disc and scanned in the computer. Thus, the computer is set in a desired state.

Despite this fact, however, the scan-out memory has a limited capacity making it difficult to store data of various registers over a number of cycles. Moreover, since the computer is driven on a single clock, it is so exclusively used as to cause a deterioration in efficiency.

The current computer adjusting technology requires an improved method of adjusting a computer that overcomes these problems to thereby provide an advanced adjusting technology that is able to obtain a lot of data of the internal registers during multiple cycles and to eliminate unnecessary analysis time of the computer being adjusted.

SUMMARY OF THE INVENTION

An object of the present invention is to provide an adjustment method and apparatus of an electronic computer, which is able to store data of various règisters in a file over many cycles.

Another object of the present invention is to provide an electronic computer adjusting method and apparatus capable of storing data of various registers in a file without exclusively using the electronic computer being adjusted.

Still another object of the present invention is to provide an electronic computer adjusting method and apparatus for testing an electronic computer to be adjusted by executing a logical simulation from a state midway of the testing operations of the electronic computer.

An electronic computer adjusting method and apparatus for confirming the proper operations of an electronic computer to be adjusted, according to the present invention, wherein the data of the internal registers and memories of the electronic computer to be adjusted are transferred to a simulation model which simulates the electronic computer to be adjusted. The simulation is executed from a state midway of the execution of the operations of the electronic computer to be adjusted, and the states of the internal registers of the electronic computer are determined in the simulation model and stored in the file.

According to the configuration described in the foregoing, an adjusting method and apparatus of a computer obtain a large amount of data of the internal registers of a computer to be adjusted by using a simulation model of the computer to be adjusted.

BRIEF DESCRIPTION OF THE DRAWINGS

The present invention may take physical form in certain parts and arrangements of parts which will be described in detail in the specification and illustrated in the accompanying drawings, which form a part of the specification and wherein.

DESCRIPTION OF THE PREFERRED EMBODIMENT

Figure 1:
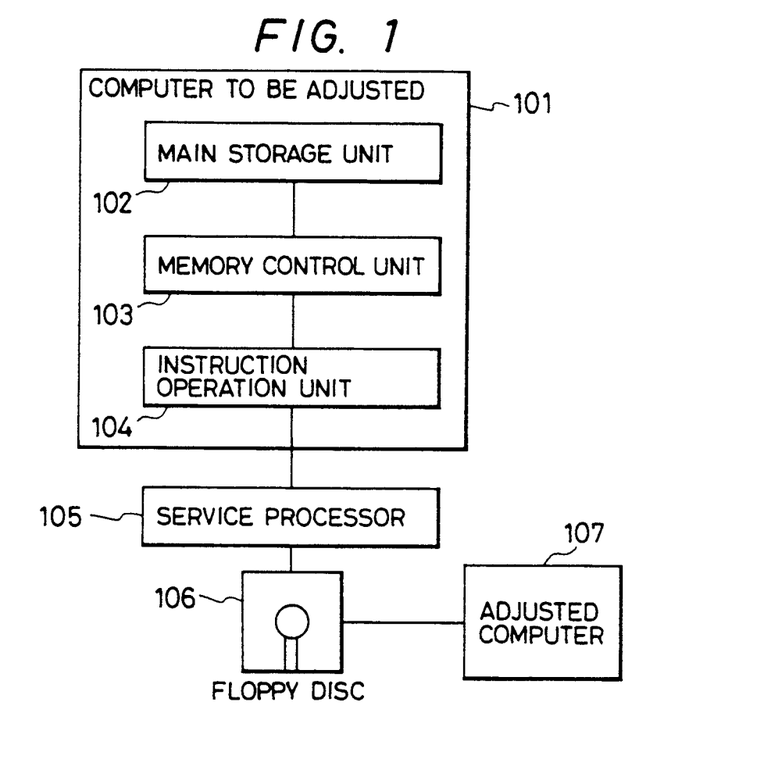
FIG. 1 shows the overall structure of one embodiment of the present invention.

FIG. 1 is a block diagram showing a computer to be adjusted which is equipped with a logical simulator.

An already adjusted computer is a computer that has been previously adjusted. An already adjusted computer is herein after called an adjusted or a previously adjusted computer.

The computer 101 to be adjusted is composed of a main storage unit 102 for storing an adjusting program and an address translation table, a memory control unit 103 for controlling the main storage unit 102, and an instruction processing unit 104 for decoding and executing the instruction read out from the main storage unit 102 under control of the memory control unit 103.

The adjusting program also known as a testing program is used to determine whether instructions are executed properly in the electronic computer in order that an adjustment may be made to the electronic computer as necessary.

The computer 101 to be adjusted is connected to a service processor 105 which used for maintaining the computer to be adjusted 101. For adjustment or on the occurrence of a failure of the computer 101, the service processor 105 stores the internal state of the computer 101 on a floppy disc 106. An adjusted computer 107 has a logical simulator model of the computer 101 and initially sets the logical simulator on the basis of the stored content of the floppy disk 106.

Figure 2:
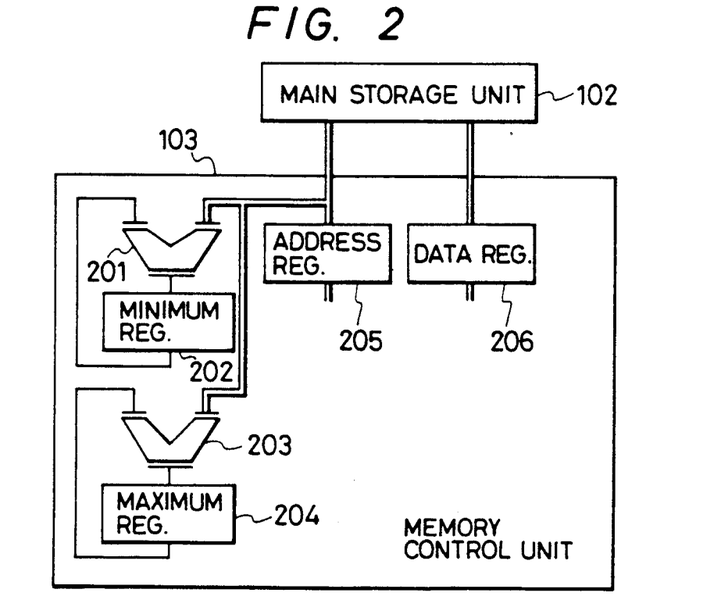
FIG. 2 shows the configuration of a memory control unit.

FIG. 2 is a block diagram showing a portion of the memory control unit 103. The memory control unit 103 includes a buffer memory connected to a data register 206, an address translation unit for translating a virtual address in the instruction operation unit 104 into a real address of the main storage unit 102 by making use of the address translation table or translation lookaside buffer (TLB) or translation table in the main storage unit, and an address register 205 for setting the translated address. The buffer memory and the address translation unit are well known in the art and are not shown for the purpose of simplifying illustration. The memory control unit 103 further includes an operation unit MIN 201 for determining the minimum of the addresses set in the address register 205, a minimum address register 202 for storing the minimum address determined by the operation unit MIN 201, an operation unit MAX 203 for determining the maximum of the addresses set in the address register 205, and a maximum address register 204 for storing the maximum address determined by the operation unit MAX 203.

The operations for determining the minimum address will be described in the following. The address set in the address register 205 is loaded in the minimum address register 202. After this, the address set in the address register 205 and the content of the minimum address register 202 are compared by the operation unit MIN 201. If the content of the address register 205 is smaller, the minimum address register 202 is rewritten into with the content of the address register 205. By continuing these operations, the minimum address is stored in the minimum address register 202.

The determination of the maximum address is accomplished similar to the aforementioned operations.

Figure 3:
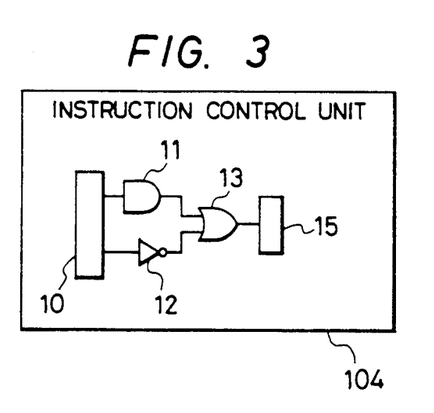
FIG. 3 shows the configuration of an instruction operation unit.

The instruction operation unit 104 is includes, as is well known in the art, a number of operation units, program status word (PSW) registers and other registers. However, only a portion of the logic of the instruction operation unit 104 is shown in FIG. 3 for simplification of the description. As shown, logic elements 11 to 13 are interposed between registers 10 and 15. These registers 10 and 15 can scan the data in and out with aid of the service processor.

Figure 4:
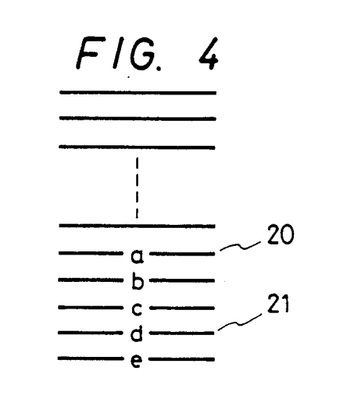
FIG. 4 shows an example of an adjusting program.

FIG. 4 shows an example of the adjusting program to be stored in the main storage unit 102. An adjusting program is a series of instructions to operate the computer to be adjusted. Reference numerals a, b, - - -, and f appearing in FIG. 4 designate instructions. Here, the following description will be made assuming that an instruction d21 to be one using the logic elements 11 to 13 of FIG. 3 and that a logical failure is detected upon execution of the instruction d.

If a logical failure of the computer 101 to be adjusted is detected, an adjustor instructs the service processor 105 to interrupt the execution of an arbitrary instruction (e.g., a20) which had been executed prior to the instruction d executed upon detection of the logical failure. The adjustor then causes the computer 101 to execute the adjusting program again from the start.

The computer to be adjusted is stopped when the instruction a is executed.

Figure 5:
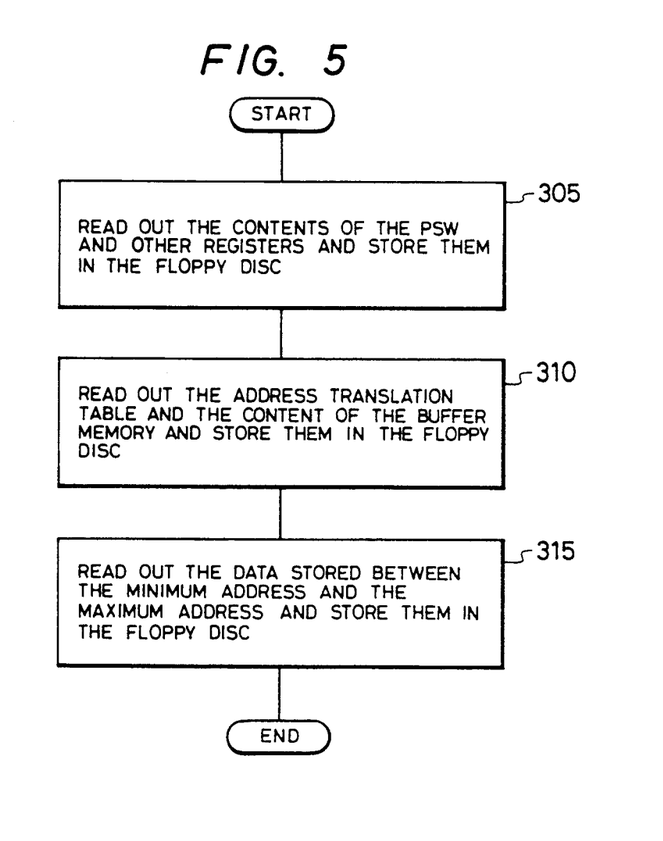
FIG. 5 shows the processing flow chart of a service processor.

FIG. 5 shows the operations of the service processor 105 for saving the internal state of the computer 101 in the floppy disc 106 when the computer 101 is stopped.

First of all, the contents of the PSW register and other registers of the computer 101 are read out and stored on the floppy disc 106 (at a step 305). At this time, the data of the PSW register and other registers are caused to correspond to the scan map loaded in the service processor. Specifically, the register names to be used in the simulation model are given to the data of the PSW register and other registers.

Next, the contents of the RAM and ROM memories such as buffer memories and the address translation table are read out and stored in the floppy disc 106 (at a step 310).

Then, the data stored between the addresses designated by the maximum address register 204 and minimum address register (as shown in FIG. 2) are read out from the main storage unit and stored in the floppy disc (at a step 315).

Figure 6:
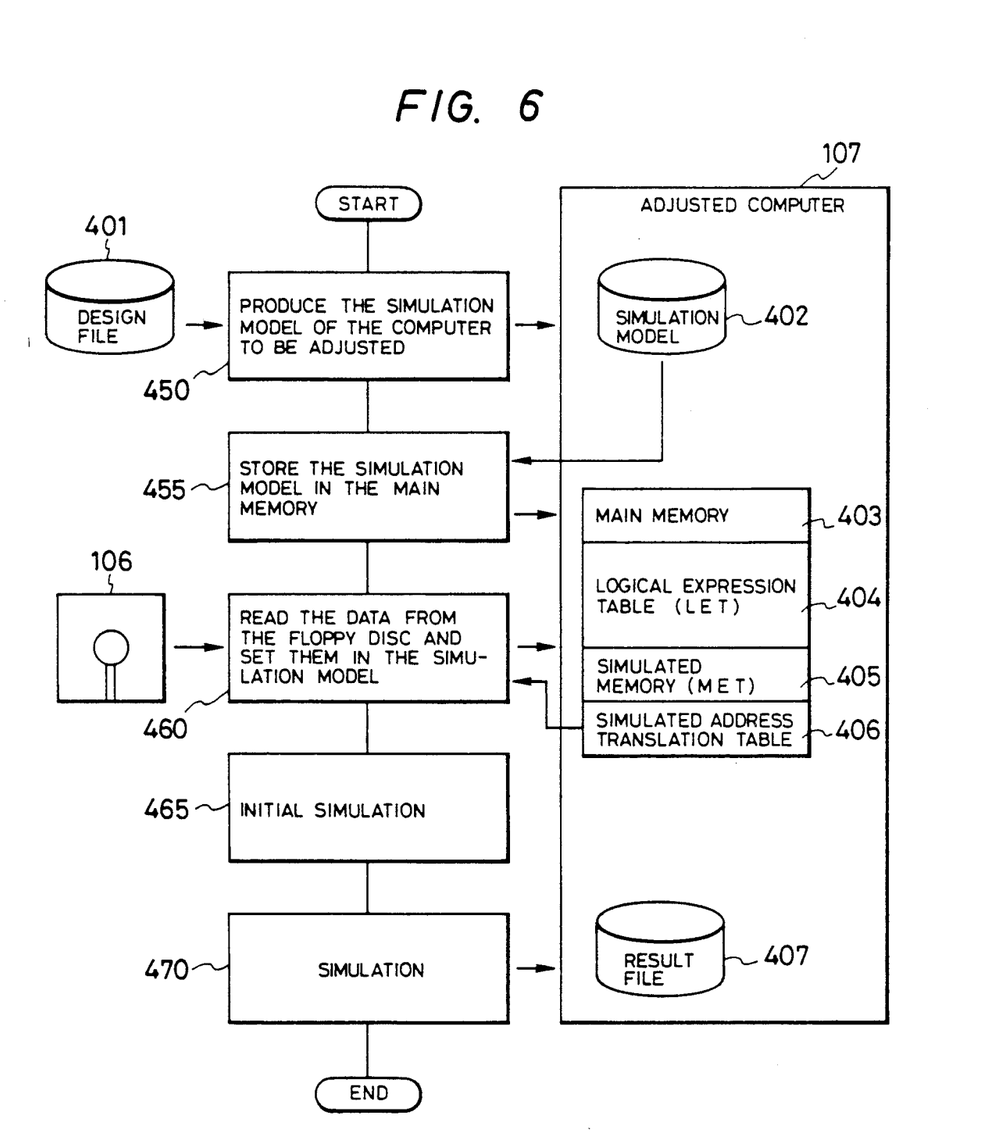
FIG. 6 shows a simulation in an adjusted computer.

The individual operations in the adjusted computer 107 will be described in the following. FIG. 6 is a flow chart showing the overall operations in the adjusted computer 107.

On the basis of a design file 401 describing the logic of the computer 101 to be adjusted, there is produced a logic simulation model 402 which is a translation of the computer 101 into a form capable of executing logical simulations (at a step 450).

The simulation model 402 is stored as a logical expression table 404 in the main memory 403 of the adjusted computer 107.

A simulated memory 405 for simulating the main memory of the computer to be adjusted and a simulated address translation table 406 for simulating the address translation table of the computer to be adjusted are stored in the main memory 403 (at a step 460).

Figure 9:
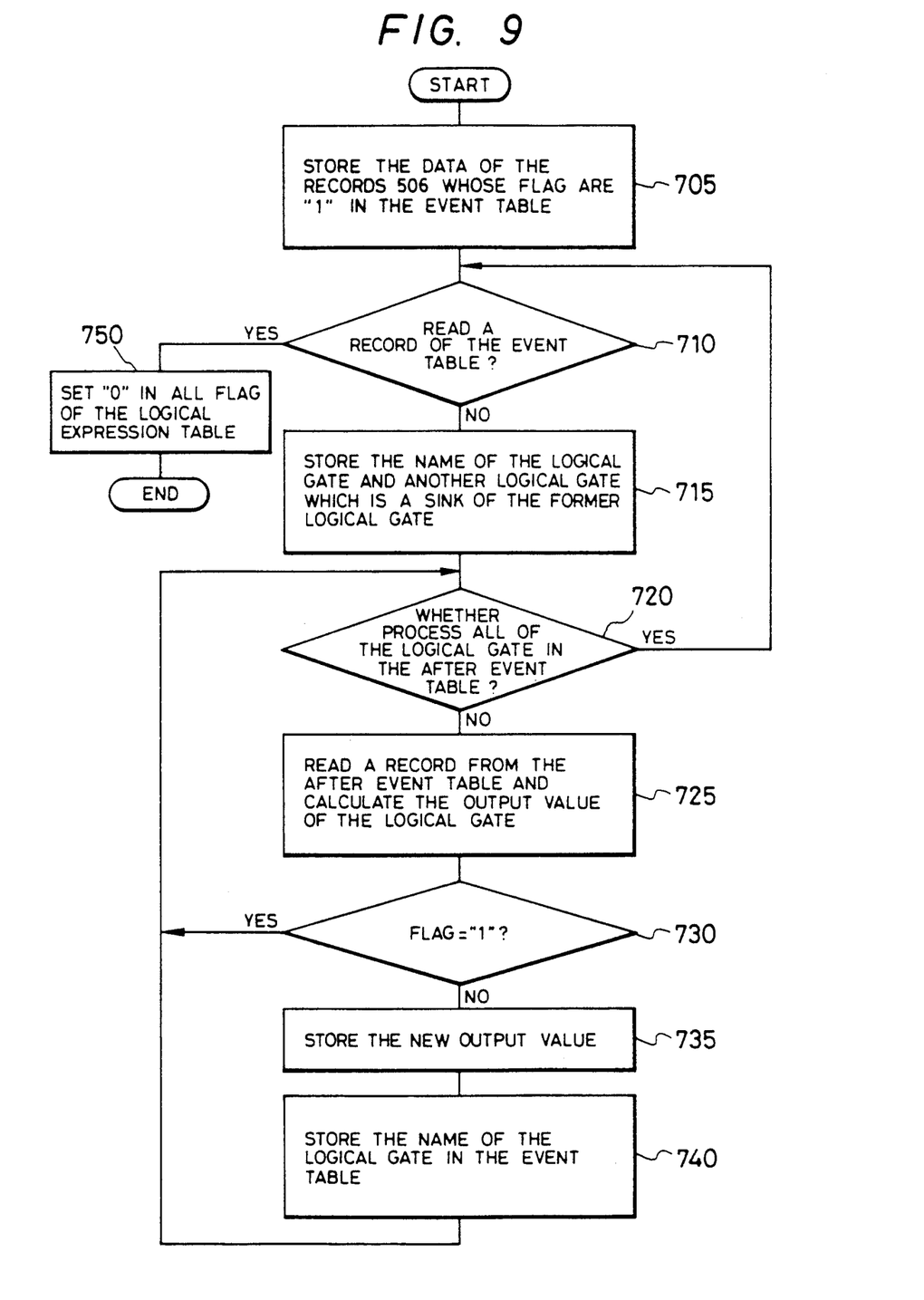
FIG. 9 shows an initial simulation processing flow chart.

An initial simulation which is described by using FIG. 9 is conducted (at a step 465).

The simulation of a designated cycle is executed, and the result is stored in a result file 407 in the adjusted computer (at a step 470). Here, the designated cycle is one for executing the instruction d (as shown in FIG. 4). At the step 470, the instructions b to d are executed according to the simulation model of the computer 101 to be adjusted.

In the steps 450 to 470 described above, the simulation model 402 will be first described in detail with reference to FIG. 7.

Figure 7:
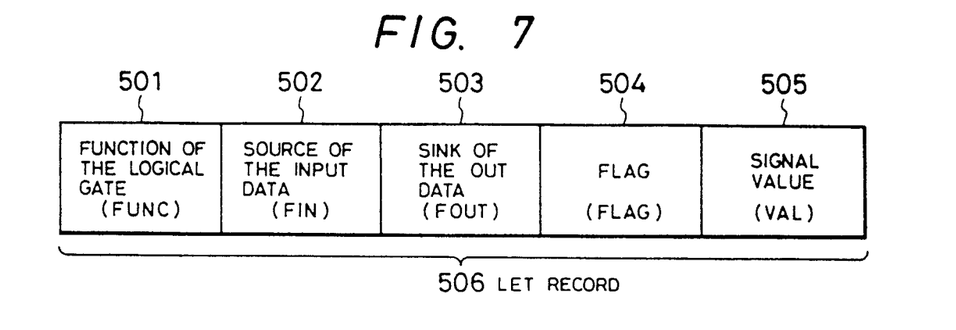
FIG. 7 shows the record layout of a logical expression table LET.

FIG. 7 is a diagram showing the logical expression table record 506 corresponding to each of the logical gates (e.g., the register 10 or 15, or the logic 11, 12 or 13, as shown in FIG. 3).

The record 506 is composed of a FUNC 501 for storing the element function of a corresponding logical gate, a FIN 502 for storing information indicating the logical gate to be inputted to that logical gate, a FOUT 503 for storing information indicating the logical gate to be outputted from the logical gate, a VAL 505 for storing the output signal value of the logical gate, and a FLAG 504 for designating whether or not occurrence of an event is to be suppressed. The event implies variations of an output signal depending upon the input data. When the content of the FLAG is 1, the occurrence of the event is suppressed. In other words, the rewrite of the value of the VAL 505 is inhibited.

When the step 455 (as shown in FIG. 6) is executed, the data of the simulation model 402 are stored in the FUNC 501, the FIN 502, the FOUT 503 and the FLAG 504. On the other hand, the value "0" is stored in the VAL 505.

Figure 8:
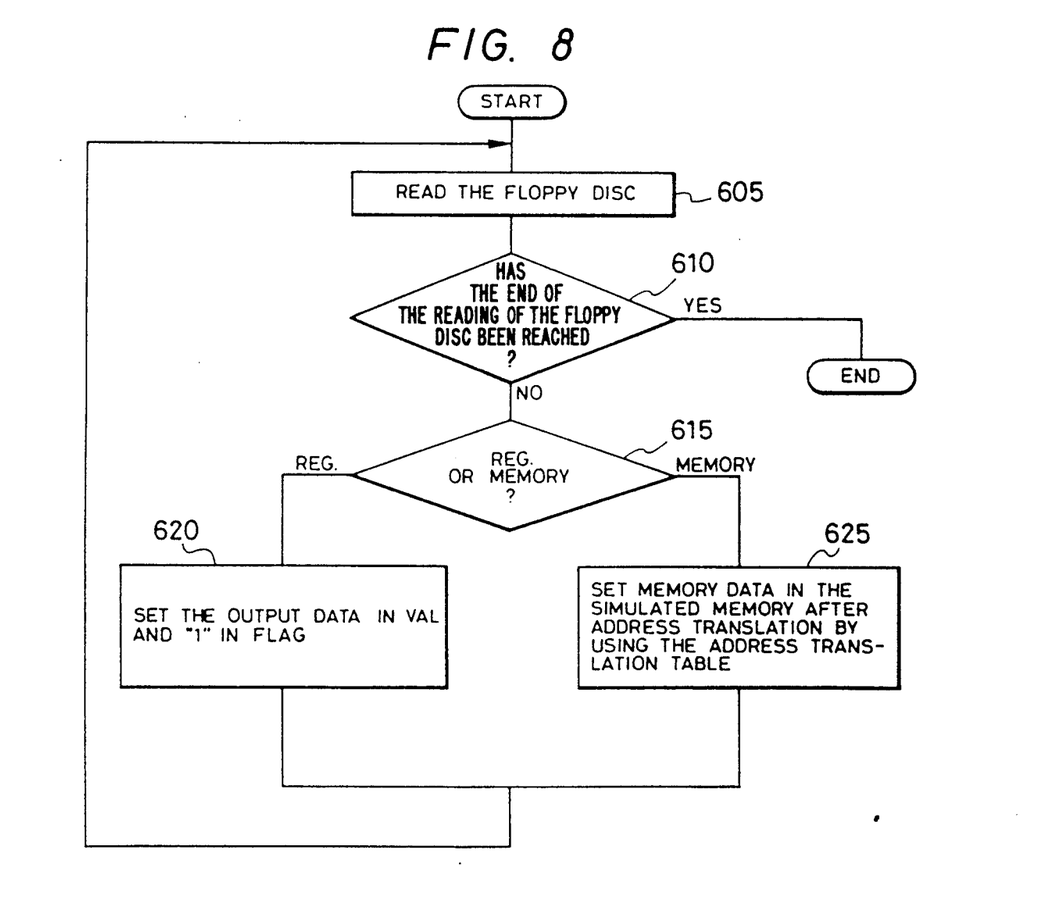
FIG. 8 shows an initial setting from a floppy disc to a simulation data unit.

FIG. 8 shows the detail of the step 460 (as shown in FIG. 6). The address translation table stored in the floppy disc before execution of this step is stored as the simulated address translation table 406 in the main memory 403 of the adjusted computer.

Data is read out from the floppy disc 106 (at a step 605). It is judged whether the data belong to the registers of the computer 101 to be adjusted or the main storage unit 102 (at a step 615).

If the data belong to a register (including the PSW), they are set in the VAL 505 of the record (as shown in FIG. 7) of the logical expression table 404 corresponding to that register, and the value "1" is set in the FLAG 504 so as to indicate no propagation of the event (at a step 620).

If the judgement of the step 615 reveals that the data belong to the main storage unit, the memory data in the simulated memory is set after address translation into a real one by using the address translation table (at a step 625).

These operations are repeated to judge the end of the reading of the floppy disc 106. If this reading ends, the step 460 is ended (at the step 610).

By the operations described above, the value of the register before the stop of the computer to be adjusted is set in the VAL of the record corresponding to the register of the logical expression table 404. This means that the simulation model has been set in the stop state of the computer to be adjusted.

The PSW set in the simulation model indicates the instruction b subsequent to the instruction a when the computer to be adjusted stops.

FIG. 9 is a flow chart showing the initial simulation.

Figure 10:
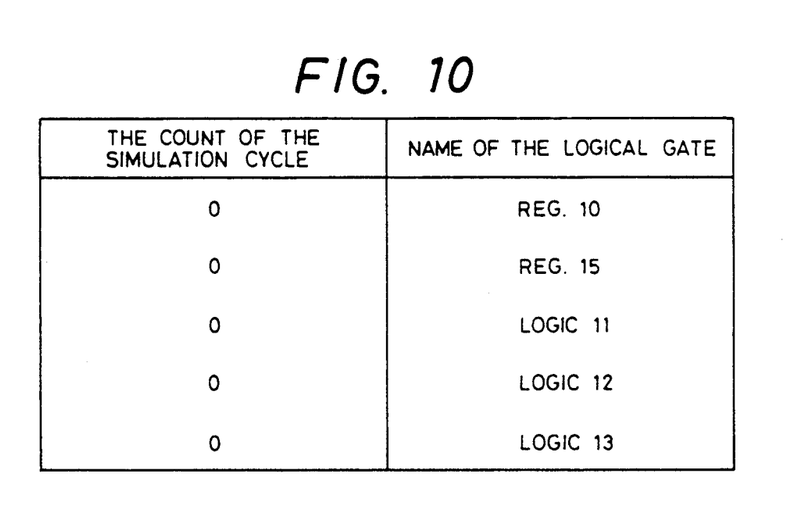
FIG. 10 shows an event table.

All the records of the logical expression table 404, whose FLAG 504 is at "1", i.e., the records corresponding to the registers of the computer 101 are registered in the event table (as shown in FIG. 10) (at a step 705). This event table is shown in FIG. 10. The event table is composed of records for storing the time periods and the logical gates and stores the names of the logical gates and the number of execution cycles (i.e., the time points when an instruction is executed in the simulation model), in case the outputs of the logical gates vary. Here, the registration in the event table is to store the register names of the computer to be adjusted in the event table.

In the example of FIG. 3, the registers 10 and 15 are registered as the logical gate names, and the execution cycle number is at "0" because no instruction is executed yet in the simulation model.

Next, the records are fetched one by one from the event table. At this time, it is judged whether or not all the records have been processed.

Figure 11:
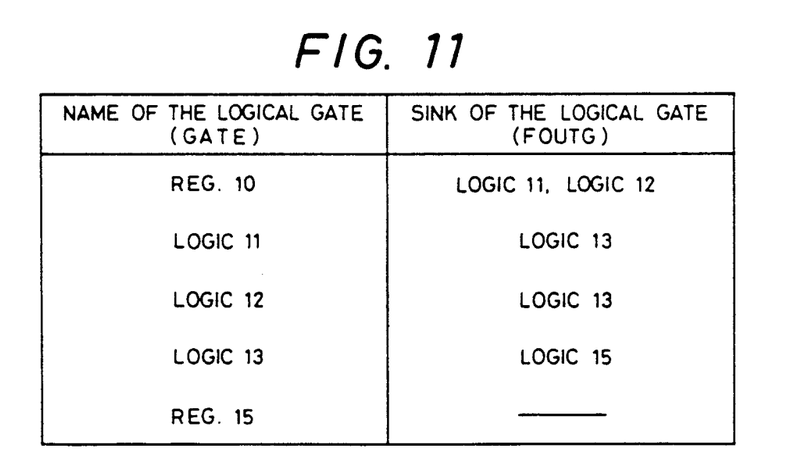
FIG. 11 shows an after event table.

On the basis of the logical gate name of the record read out, the logical gate or a sink of the register is determined from the FOUT 503 of the logical expression table, and the sink logical gate name and the logical gate name fetched from said record are associated and stored in an after event table (as shown in FIG. 11) (at a step 715).

FIG. 11 presents the after event table. This table is composed of a column (GATE), in which the name of the logical gate fetched from the record is stored, and a column (FOUTG), in which the sink of the logical gate is stored.

As to the logical gates of the after event table, it is judged whether or not the operations of steps 725 to 740 to be described in the following have been ended. If YES, the routine is returned to the step 710 (at a step 720).

The logical gate name is fetched from the FOUTG of the after event table, and the record of the input logical gate (i.e., the logical gate stored in the "GATE") is determined by retrieving the logical expression table to read out the data of the VAL 505. These data are inputted to the logical gate (FOUTG). On the basis of the input data and the function of the logical gate (FOUTG), the output value of the logical gate of the FOUTG is calculated (at a step 725).

It is judged whether or not the FLAG of the logical expression table corresponding to that logical gate (FOUTG) is at "0" (at a step 73).

For the FLAG at "0", it is judged whether or not the content of the VAL of the logical expression table corresponding to the logical gate (FOUTG) and the output value determined at the step 725 are different. If YES, a new output value is stored in the VAL of the logical expression table (at a step 735).

The name of the logical gate (FOUTG) is registered in the event table (at a step 740).

The operation of the logical gate having the FLAG at "1" is branched at the step 730, even if its output value varies, so as not to rewrite the content of the VAL. This holds the initially set state without fail. If the event table is emptied, all the FLAGs of the logical event table is set at "0" (at a step 750).

FIGS. 10 and 11 present examples of the event table and the after event table, which are prepared in accordance with the flow chart of FIG. 9.

Figure 12:
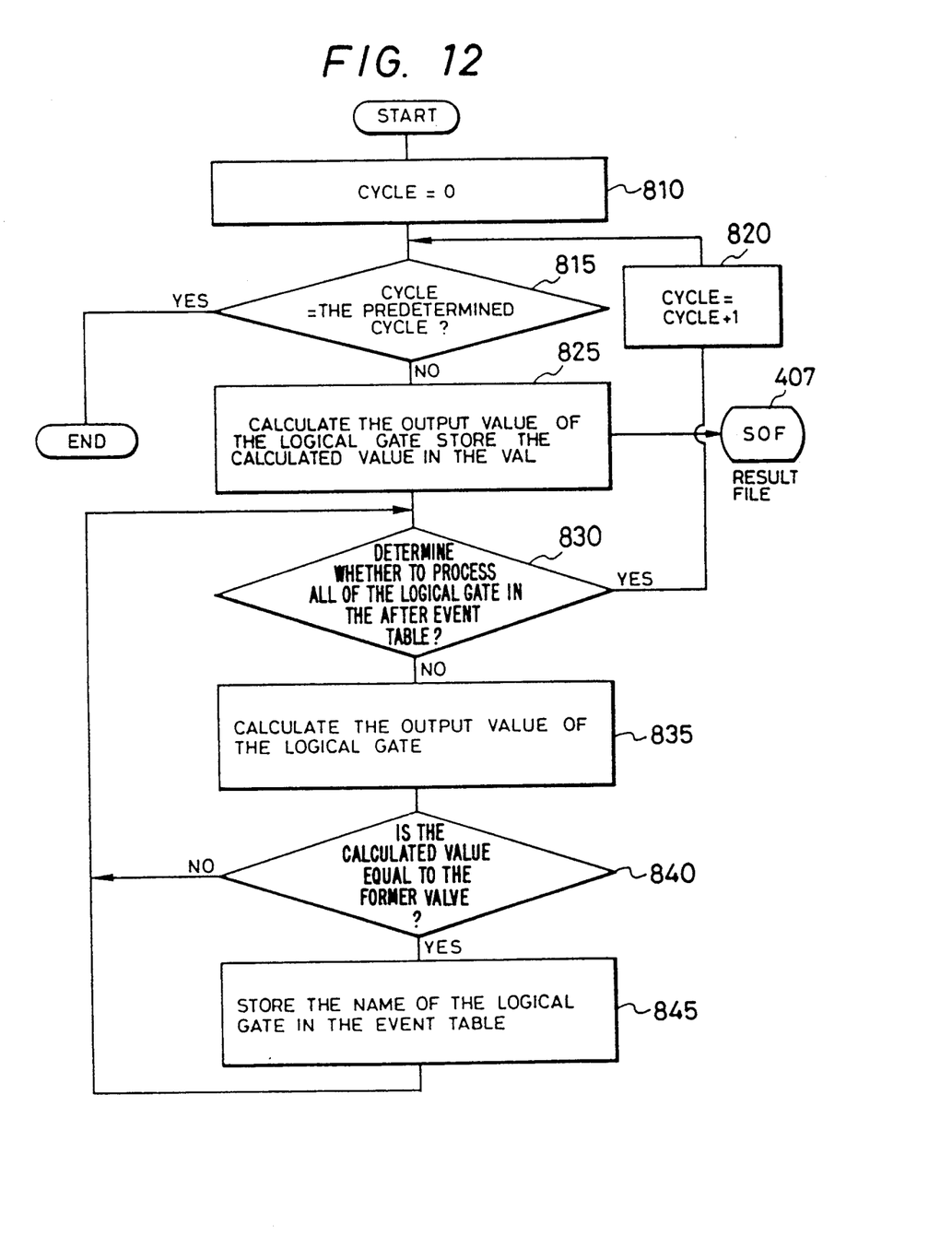
FIG. 12 shows a simulation processing flow chart.

FIG. 12 is a flow chart showing the detail of the step 470 (as shown in FIG. 6).

At a step 810, the execution cycle number is set at "0" for initialization.

The logical gate names are fetched sequentially one by one from the record of the execution cycle number=CYCLE of the event table, and the output value of the logical gate is calcualted. The manner of calculations is the same as that of the step 725 (as shown in FIG. 9). The result is stored in the VAL 505 of the logical expression table and also in a result file 407 together with the value CYCLE of this time (at a step 825). In this case, the logical gate names are fetched sequentially that corresponding to the register from the event table.

On the basis of the logical gate name, the after event table is retrieved to determine the sink logical gate from the FOUTG of the record retrieved, and the output value of the sink logical gate is calculated (at a step 835).

The calculated result at the step 835 is compared with the former value (which is stored in the logical expression table). If different, the sink logical gate name is stored in the event table. Then, the number execution cycles is registered as CYCLE=CYCLE+1 in the event table (at a step 845).

The steps 835 to 845 described above are conducted for all the records registered in the after event table (at a step 830).

After the end of the operations of all the records of the after event table, the value "1" is added to the CYCLE, and the routine enters a subsequent execution cycle (at a step 820).

When the execution cycle reaches a predetermined number, the operations are ended (at a step 815). In this case, the predetermined number of cycles continues till the end of the instruction d (as shown in FIG. 4) in the simulation model.

Thus, all the output values of the gate, at which an event occurs, are outputted to the result file so that the logic to be simulated can observe all the signal variations.

According to the present embodiment, it is possible to reproduce the internal state (such as the registers or the memories) of the computer to be adjusted on the simulation model and to observe the signal values of the individual portions of the logical circuit easily by subsequently executing the simulation. According to the method of the prior art, on the contrary, a signal line to be observed is connected with a scan-out memory so that this scan-out memory is observed by means of a service processor. Since the observation cycle is limited, it has to be troublesomely repeated for tracing a cause for a failure. In the present invention, however, a signal to be looked at can be observed in a desired cycle by indicating the data of the result file obtained after the simulation by means of a terminal display unit. As a result, the failure cause tracing period, i.e., the adjusting period can be highly shortened. Moreover, a plurality of failure analyses can be accomplished in parallel by multi-programming of the simulation model.

According to the present invention, still moreover, the signal value of each portion of the logical circuit can be easily observed by reproducing the internal state (e.g., the registers or memories) of the computer to be adjusted on the simulation model and by subsequently executing the simulation, so that the computer can be easily adjusted.

What is claimed is:

1. A method for providing data for adjusting an electronic computer having a main storage unit in a system including a service processor connected to said electronic computer to maintain said electronic computer, and an external storage unit for storing data of internal registers of said electronic computer read out by said service processor, comprising the steps of:

executing an adjusting program having a series of instructions for operating said electronic computer until a logical failure is detected in said electronic computer;

instructing said service processor to stop the execution of said adjusting program at an instruction an arbitrary number of instructions before the instruction on which said logical failure of said electronic computer was detected;

re-executing said adjusting program in said electronic computer in response to said instructing step;

storing data of said internal registers and said main storage unit of said electronic computer, when said electronic computer stops said re-execution, in said external storage unit through said service processor;

preparing a previously adjusted electronic computer to simulate operation of said electronic computer;

constructing a simulation model of said electronic computer in said previously adjusted electronic computer;

setting data of said external storage unit in said simulation model;

executing a simulation in said simulation model in said previously adjusted electronic computer to determine the state of said internal registers of said electronic computer in said simulation model;

wherein said electronic computer further includes a minimum address register and a maximum address register; and determining a minimum address and a maximum address of said main storage unit used during execution of said adjusting program and storing said minimum and maximum addresses in said minimum and maximum address registers respectively, wherein said step of storing data in said external storage unit includes a substep of storing data, from a region of said main storage unit between addresses corresponding to said minimum and maximum addresses stored in said minimum and maximum address registers, into said external storage unit.

2. A system for providing data for adjusting an electronic computer comprising:

a service processor connected with said electronic computer to maintain said electronic computer;

means for executing an adjusting program having a series of instructions for operating said electronic computer until a logical failure is detected in said electronic computer;

means for stopping execution of said adjusting program at an instruction an arbitrary number of instructions before the instruction on which said logical failure of said electronic computer was detected;

means for causing said electronic computer to re-execute said adjusting program after said stopping means is activated;

an external storage unit for storing therein data, of internal registers and said main storage unit of said electronic computer, when said electronic computer stops execution of said adjusting program, said data being supplied to said external storage unit through said service processor;

a previously adjusted electronic computer for constructing a simulation model of said electronic computer to be adjusted;

means for setting data of said external storage unit in said simulation model;

means for starting execution of a simulation using said simulation model in said previously adjusted electronic computer;

a file for storing a state of said internal registers of said electronic computer obtained from execution of said simulation using said simulation model; and minimum and maximum address registers and minimum and maximum address determining means for determining a minimum and maximum address of said main storage unit used during execution of said adjusting program and storing said minimum and maximum addresses in said minimum and maximum address registers respectively, wherein said service processor includes means for storing data, from a region of said main storage unit between addresses corresponding to said minimum and maximum addresses stored in said minimum and maximum address registers, into said external storage unit.

3. A method for providing data for adjusting an electronic computer having a main storage unit in a system and an external storage unit for storing data of internal registers of said electronic computer, comprising the steps of:

executing an adjusting program having a series of instructions for operating said electronic computer until a logical failure is detected in said electronic computer;

instructing said electronic computer to stop execution of said adjusting program at an instruction an arbitrary number of instructions before the instruction on which said logical failure of said electronic computer was detected;

re-executing said adjusting program in said electronic computer in response to said instructing step;

determining a minimum address and a maximum address of said main storage unit used during execution of said adjusting program;

storing data, of said internal registers and data of a region from said minimum address to said maximum address of said main storage unit, into said external storage unit when said electronic computer stops said re-execution;

preparing a previously adjusted electronic computer to simulate operation of said electronic computer;

constructing a simulation model of said electronic computer in said previously adjusted electronic computer;

setting data of said external storage unit in said simulation model; and executing a simulation in said simulation model in said previously adjusted electronic computer to determine the state of said internal registers of said electronic computer in said simulation model.

4. A method for providing data for adjusting an electronic computer according to claim 3, wherein said electronic computer has a logical circuit including a minimum address register and a maximum address register, and said step of determining a minimum address and a maximum address of said main storage unit is performed by said logical circuit including a minimum address register and a maximum address register.

5. A system for providing data for adjusting an electronic computer including a main storage unit, comprising:

means for executing an adjusting program having a series of instructions for operating said electronic computer until a logical failure is detected in said electronic computer;

means for stopping execution of said adjusting program at an instruction an arbitrary number of instructions before the instruction on which said failure of said electronic computer was detected;

means for causing said electronic computer to re-execute said adjusting program after said stopping means is activated;

means for determining minimum and maximum addresses of said main storage unit used during execution of said adjusting program;

an external storage unit for storing therein data of internal registers and data of a region from said minimum address to said maximum address of said main storage unit, when said electronic computer stops re-execution of said adjusting program, said data being supplied to said external storage unit;

a previously adjusted electronic computer for constructing a simulation model of said electronic computer to be adjusted;

means for setting data of said external storage unit in said simulation model;

means for starting execution of a simulation using said simulation model in said previously adjusted electronic computer; and a file for storing a state of said internal registers of said electronic computer obtained from execution of said simulation using said simulation model.

6. A system for providing data for adjusting an electronic computer according to claim 5, wherein said means for determining a minimum address and a maximum address of said main storage unit is a logical circuit including a minimum address register and a maximum address register provided in said electronic computer.

7. A method for providing data for adjusting an electronic computer having a main storage unit in a system including a service processor connected to said electronic computer to maintain said electronic computer, and an external storage unit for storing data of internal registers of said electronic computer read out by said service processor, comprising the steps of:

executing an adjusting program having a series of instructions for operating said electronic computer until a logical failure is detected in said electronic computer;

instructing said service processor to stop execution of said adjusting program at an instruction an arbitrary number of instructions before the instruction on which said logical failure of said electronic computer was detected;

re-executing said adjusting program in said electronic computer in response to said instructing step;

determining a minimum address and a maximum address of said main storage unit used during execution of said adjusting program;

storing data, of said internal registers and data of a region from said minimum address to said maximum address of said main storage unit, into said external storage unit through said service processor when said electronic computer stops said re-execution;

preparing a previously adjusted electronic computer to simulate operation of said electronic computer;

constructing a simulation model of said electronic computer in said previously adjusted electronic computer;

setting data of said external storage unit in said simulation model; and executing a simulation in said simulation model in said previously adjusted electronic computer to determine the state of said internal registers of said electronic computer in said simulation model.

8. A method for providing data for adjusting an electronic computer according to claim 7, wherein said electronic computer has a logical circuit including a minimum address register and a maximum address register, and said step of determining a minimum address and a maximum address of said main storage unit is performed by said logical circuit including a minimum address register and a maximum address register.

9. A system for providing data for adjusting an electronic computer including a main storage unit, comprising:

a service processor connected with said electronic computer to maintain said electronic computer;

means for executing an adjusting program having a series of instructions for operating said electronic computer until a logical failure is detected in said electronic computer;

means for stopping execution of said adjusting program at an instruction an arbitrary number of instructions before the instruction on which said failure of said electronic computer was detected;

means for causing said electronic computer to re-execute said adjusting program after said stopping means is activated;

means for determining minimum and maximum addresses of said main storage unit used during execution of said adjusting program;

an external storage unit for storing therein data of internal registers and data of a region from said minimum address to said maximum address of said main storage unit, when said electronic computer stops re-execution of said adjusting program, said data being supplied to said external storage unit through said service processor;

a previously adjusted electronic computer for constructing a simulation model of said electronic computer to be adjusted;

means for setting data of said external storage unit in said simulation model;

means for starting execution of a simulation using said simulation model in said previously adjusted electronic computer; and a file for storing a state of said internal registers of said electronic computer obtained from execution of said simulation using said simulation model.

10. A system for providing data for adjusting an electronic computer according to claim 9, wherein said means for determining a minimum address and a maximum address of said main storage unit is a logical circuit including a minimum address register and a maximum address register provided in said electronic computer.

* * * * *